April 13, 1948.  J. HEXTER ET AL  2,439,657
SLICED LOAF DIVIDING MECHANISM
Filed Sept. 12, 1946  4 Sheets-Sheet 1

INVENTORS
JOSEPH HEXTER
WILLIAM E. LANHAM
BY
Ernest D. Given
ATTORNEY

April 13, 1948. J. HEXTER ET AL 2,439,657
SLICED LOAF DIVIDING MECHANISM
Filed Sept. 12, 1946 4 Sheets-Sheet 2

INVENTORS
JOSEPH HEXTER
WILLIAM E. LANHAM
BY
Ernest D. Given
ATTORNEY

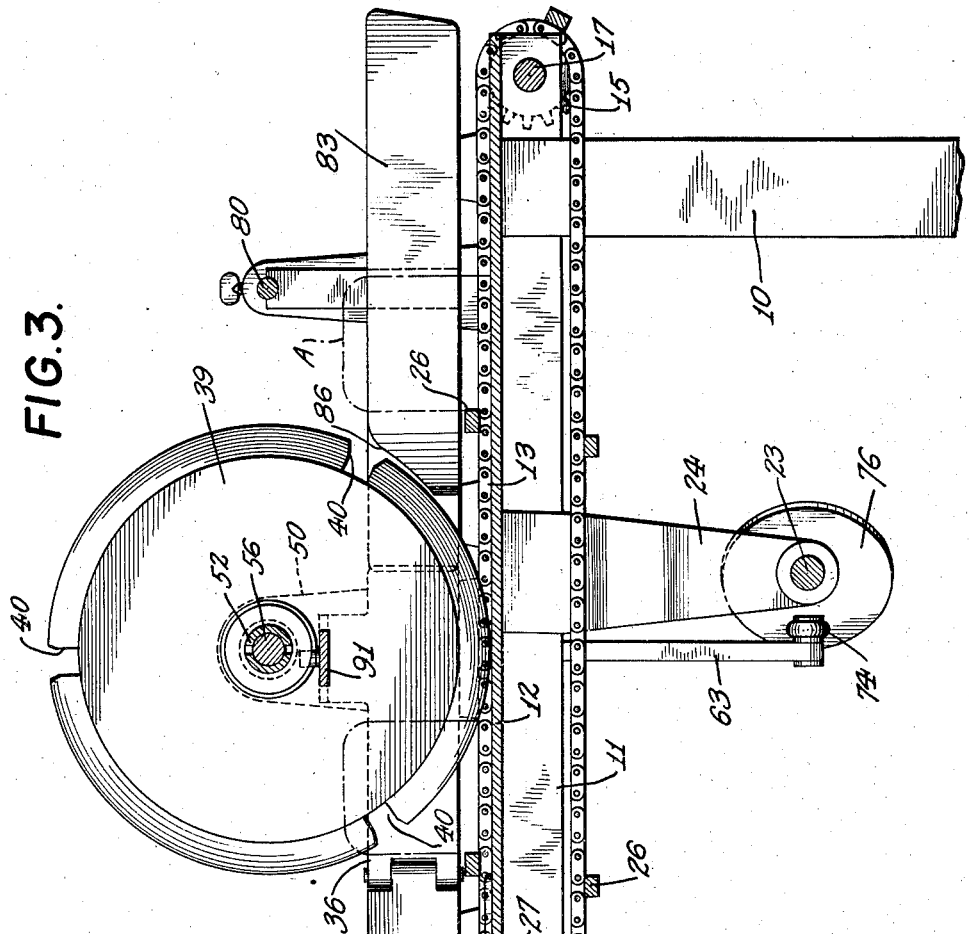

April 13, 1948.    J. HEXTER ET AL    2,439,657
SLICED LOAF DIVIDING MECHANISM
Filed Sept. 12, 1946    4 Sheets-Sheet 4

INVENTORS
JOSEPH HEXTER
WILLIAM E. LANHAN
BY
Ernest D. Given
ATTORNEY

Patented Apr. 13, 1948

2,439,657

UNITED STATES PATENT OFFICE 2,439,657

SLICED LOAF DIVIDING MECHANISM

Joseph Hexter and William E. Lanham, Atlanta, Ga.; said Lanham assignor to said Hexter Application September 12, 1946, Serial No. 696,420

10 Claims. (Cl. 146—153)

This invention relates in a general way to wrapping or packaging of bakery products and has particular reference to improvements in mechanisms for dividing or separating sliced loaves into portions which are to be separately wrapped.

One object of the invention is to provide a simple and efficient mechanism for dividing a sliced loaf into portions for subsequent separate wrapping which can be installed at a low cost wherever a dividing mechanism is required.

Another object is to provide an apparatus of the character mentioned which does not require a great deal of floor space. If used between a bread slicing machine and a wrapping mechanism the two can be quite close together thereby not only economizing floor space but speeding up the operation as a whole by cutting down the time required for the apparatus to perform its function.

With the foregoing and incidental objects in view the invention consists in a novel combination and relation of parts, one embodiment of which is illustrated in the drawings accompanying and forming a part of this specification, the novel features being pointed out in the claims appended hereto.

In the drawings:

Fig. 3 is a section on the line 3—3 of Fig. 1;

Fig. 4 is a detail section on the line 4—4 of Fig. 3, and

Figure 1:
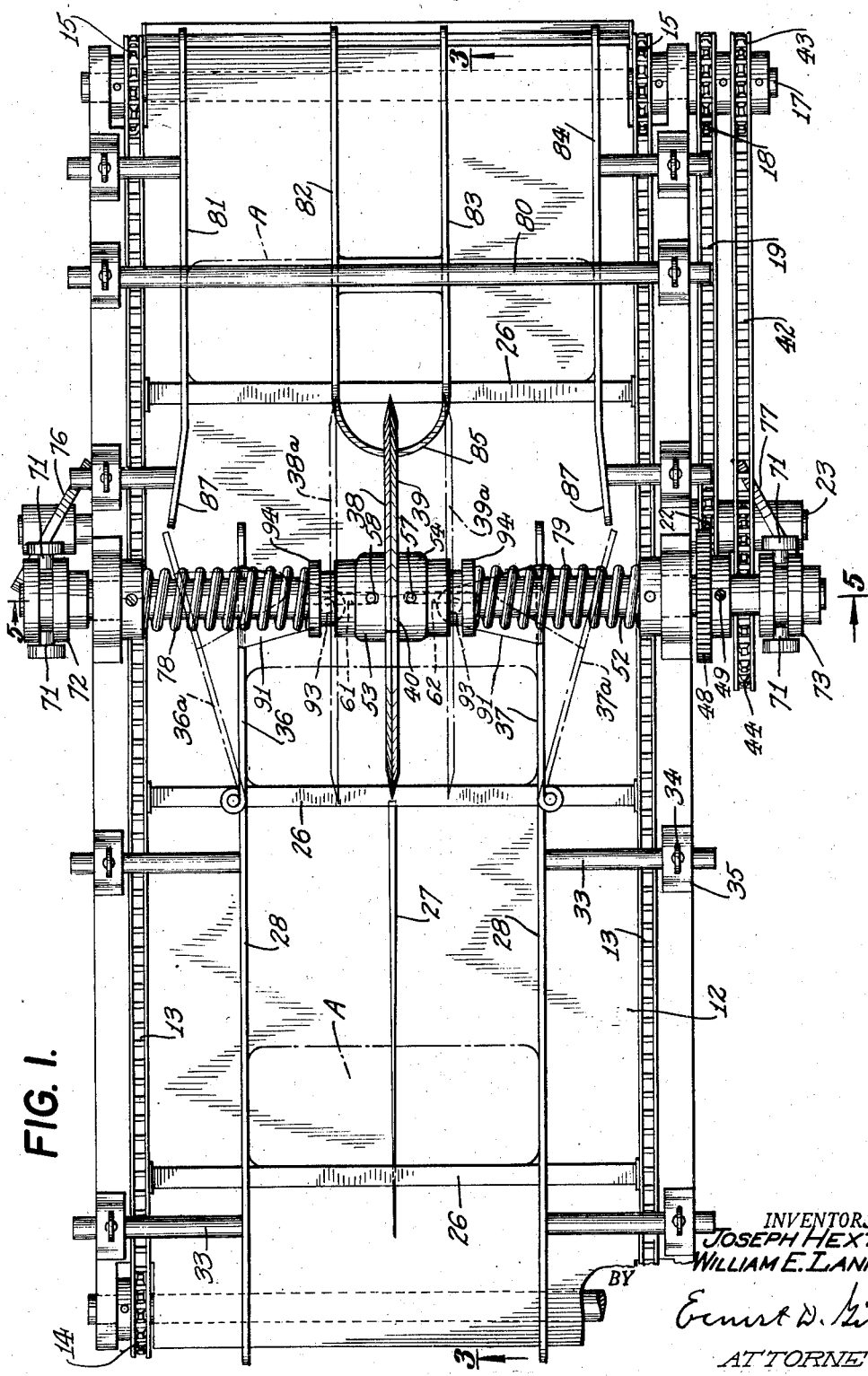
Fig. 1 is a top plan view of the mechanism.
Figure 2:
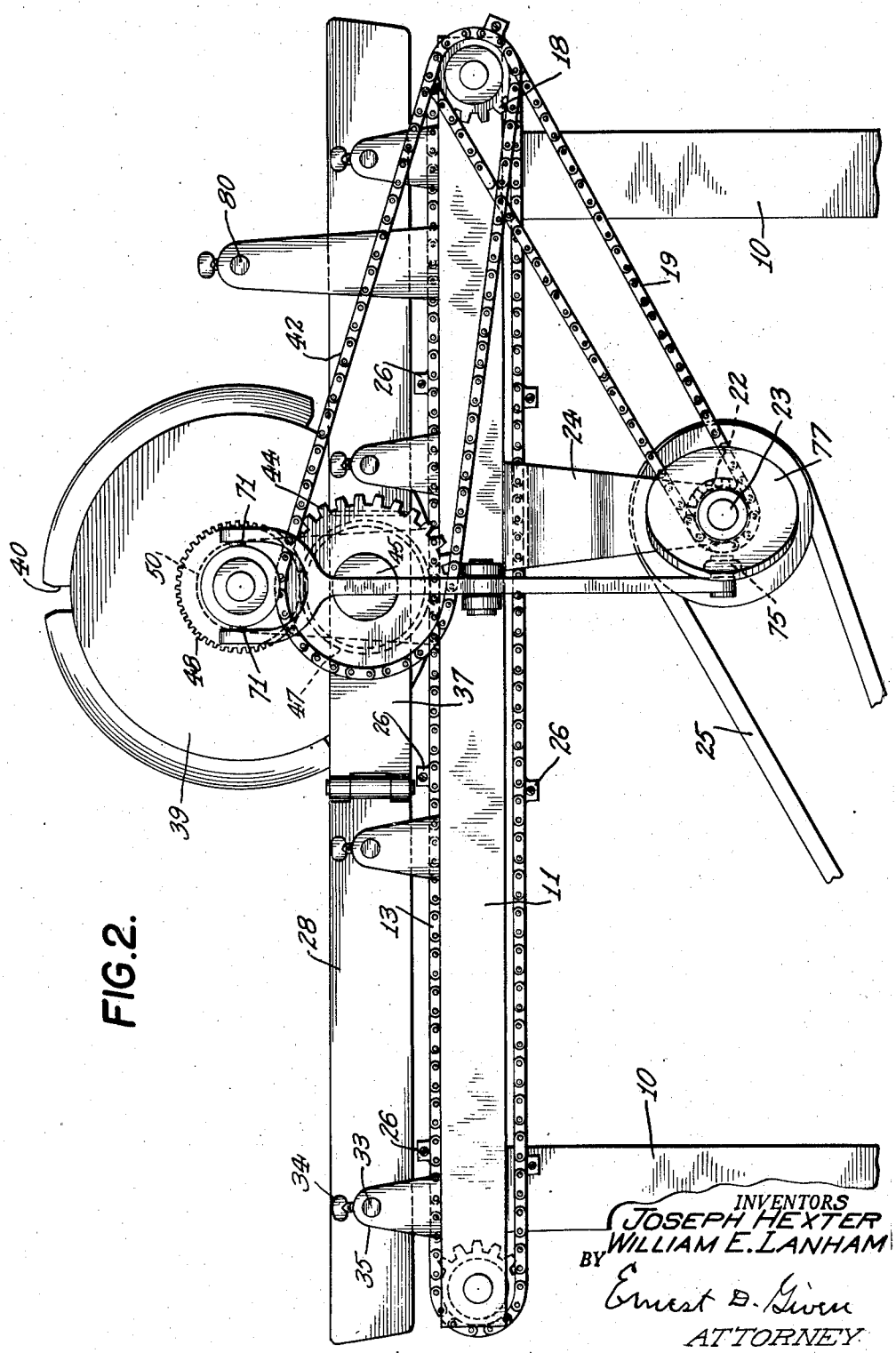
Fig. 2 is a side view.

The machine shown in the drawing comprises the usual supporting framework which includes the uprights 10 and side members 11. Extending between the side members is a plate or bed 12 which serves as a support for material such as loaves of bread A being handled by the apparatus.

Running on the plate 12 are the top strands 13 of conveyor chains which pass around sprockets 14 and 15 (Fig. 3) secured respectively to shafts 16 and 17 journaled in the side frame members 11. Also secured to the shaft 17 is another sprocket 18 which is driven by a chain 19 and a sprocket 22 secured to a shaft 23, journaled in arms 24 extending down from the side frame members 11. The shaft 23 is driven through a belt 25 from an electric motor or other suitable source of power supply (not shown).

Extending between the conveyor chains 13 are flight bars 26. Loaves of bread are sliced in the usual slicing machine (not shown) and are fed one after another by the slicing machine onto the table 12. The flight bars 26 pick up the loaves and move them over the table 12. The flight bars are spaced apart equal distances and the operation of the conveyor is timed to synchronize with the delivery mechanism of the slicing machine. A blade 27 brazed or otherwise secured to the table 12 serves as a centering guide cooperating with side guides 28. Incidentally the blade 27, which is low enough to be cleared by the flight bars 26, serves to open up to some extent, at least, one of the cuts in the loaf. The guides 28 are secured to the ends of rods 33 which are adjustably held by thumb screws 34 threaded into bosses or lugs 35 on the side frame members 11. It is apparent that the guides 28 can be adjusted as required to get proper relations with the blade 27 or alignment with other parts of the mechanism. Hinged on the guides 28 are other guides 36 and 37, the purpose of which will be clear later on.

The sliced or cut loaf being carried along by the flight bars 26 of the conveyor are separated or spaced apart by two discs 38 and 39 which normally are in face-to-face engagement and have their edges sharpened to engage the same cut in the loaf. The edges of the discs are also cut away to provide clearances 40 for the flight bars 26. In the embodiment illustrated there are three of these clearances. The guide blade 27, as before stated, slightly opens one of the cuts. This opened cut is in line with the edges of the discs and after the sliced loaf is in contact with the outer faces of the discs the discs are quickly separated to move the sections of the loaf apart on the conveyor. The mechanism for doing this comprises a driving connection for rotating the discs and separate connections for moving the discs 38 and 39 away from and toward each other.

Figure 5:
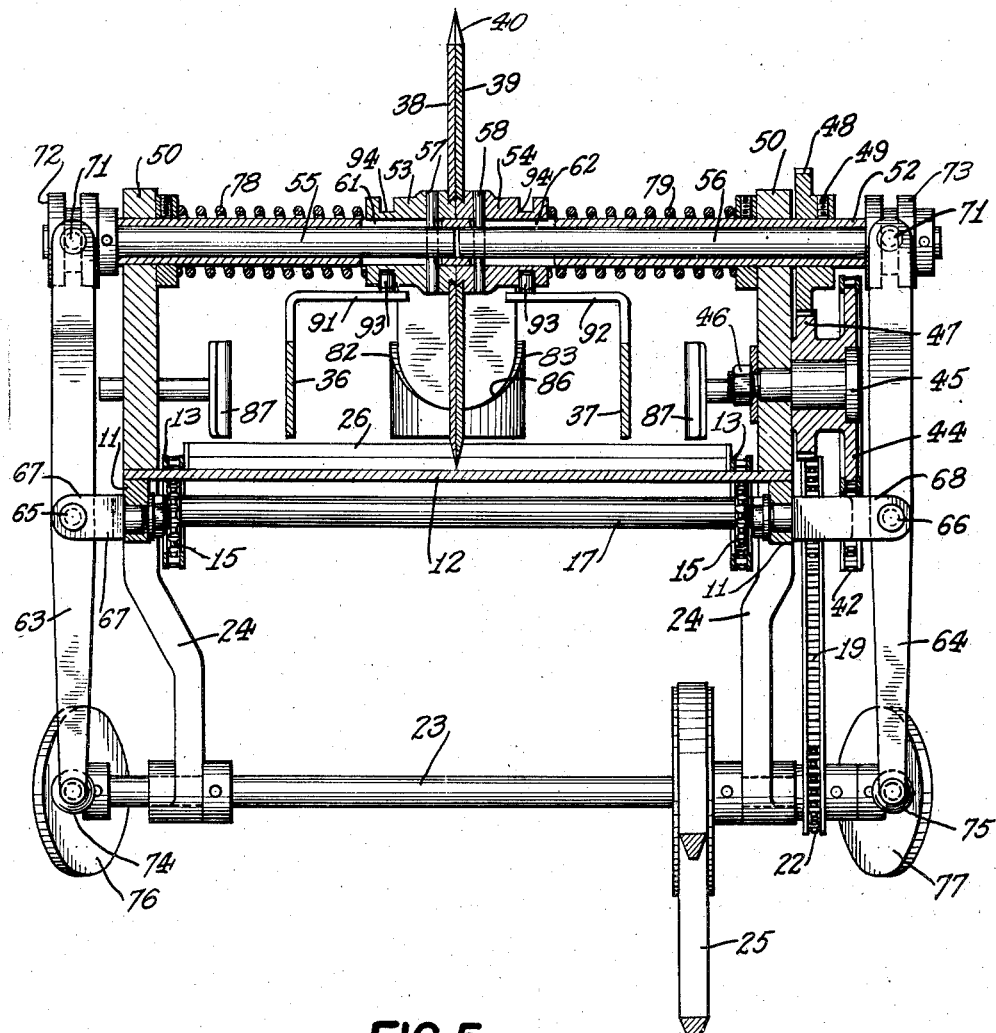
Fig. 5 is a transverse section on the line 5—5 of Fig. 1.

The discs are rotated by a chain 42 driven by a sprocket 43 attached to the shaft 17, the chain also running over a sprocket 44 rotating on a stud bolt 45 (Fig. 5) held by a nut 46 against the adjoining side frame member 11. Integral with the sprocket 44 is a gear 47 which meshes with a pinion 48 secured by a screw 49 to a tube 52 which is journaled in arms 50 extending upward from the side frame members 11. The construction is such that the tube will be driven or rotated in a fixed relation with the conveyor chains 13. In the machine illustrated in the drawings the tube 52 makes a complete rotation while the conveyor chains are carrying three flight bars past the discs 38 and 39.

The discs 38 and 39 are secured respectively to hubs 53 and 54 which are slidably mounted on the tube 52. Sliding movement of the hubs to separate the discs 38 and 39 is effected by rods 55 and 56 on the interior of the tube. Pins 57 and 58 connect the hubs 53 and 54 to the rods 55 and 56, the pins extending through longitudinal slots 61 and 62 in the tube 52. It will be seen that when the tube is driven as previously described the hubs 53 and 54 and the discs 38 and 39 will be driven in unison through the slot and pin connection previously mentioned and that the hubs, because of the slot and pin connection, may be slid along the tube 52, even though the tube and the other parts just mentioned are being driven or rotated.

The mechanism for actuating the rods 55 and 56 to slide the hubs 53 and 54 on the tube 52 includes levers 63 and 64 pivoted respectively at 65 and 66 in cut or split ends of stud bolts 67 and 68 secured in the side frame members 11. The levers 63 and 64 are forked at their upper ends and the forks carry studs or rollers 71 engaging grooves in members 72 and 73 secured respectively to the rods 55 and 56. The lower ends of the levers 63 and 64 carry cam following rollers 74 and 75 cooperating with cams 76 and 77 secured to the shaft 23. The cams are shown conventionally in the drawings but it will be readily understood that their active faces are of such configuration as to give the desired movement to the discs 38 and 39. When the cams act to separate the discs 38 and 39 springs 78 and 79 surrounding the tube 52 are compressed and act to restore the discs to face-to-face engagement as soon as the spring tension is released by the cams.

The portions of the loaf A which have been separated by spreading the discs 38 and 39 apart enter parallel guides 81, 82, 83 and 84 which serve to hold the sections of the loaf in the desired spaced apart relation. The guides 82 and 83 may be formed of a single sheet or strip of metal which is adjustably supported from an overhead cross rod 80 and is bowed as at 85. This bowed portion is cut away as shown at 86 (Fig. 3) to afford a clearance for the discs 38 and 39. The outer guides 81 and 84 may be curved outwardly at the entering ends 87 to insure proper directional movement of the sections of the loaf.

The sections of the loaf are guided into the parallel guides by the hinged guides 36 and 37 which have been previously mentioned. For this purpose the guides 36 and 37 are provided with wings or extensions 91 and 92 (Fig. 5) which carry studs or rollers 93 engaging grooves 94 in the disc carrying hubs 53 and 54. When the discs are moved apart to the positions shown in dotted outlines 38a and 39a (Fig. 1) the guides 36 and 37 will be swung to the positions indicated by dotted outlines 36a and 37a in which positions they will cooperate with the discs 38 and 39 to direct the separate portions of the loaf into the parallel guides previously mentioned. The parallel guides then hold the portions of the loaf in proper relation for delivery to a wrapping machine (not shown).

From the foregoing it will be seen that all of the parts move in synchronism so that once the apparatus is set up no adjustments are required during operation, and that the apparatus can be set up to be driven at any desired speed. Further, the conveyor is much shorter than is usual in devices of the kind so that the time of transit between the slicing machine and the wrapping machine is materially reduced. A more important feature is that the apparatus operates to perform its function without damaging the loaf even though it is run at high speeds.

While the invention has been described in connection with a specific embodiment illustrated in the drawings it will be apparent to those skilled in the art that the construction and arrangement of parts may be modified, and it is not the intention to be confined by the specification and drawings except to the extent indicated in the claims which follow.

What is claimed is:

1. In an apparatus of the character described, a conveyor for a previously cut loaf, a pair of parallel members normally in face-to-face contact having edges to engage the cut in the loaf, means for moving said members to shift the engaged sections of the loaf apart on the conveyor, and guides receiving the shifted sections and maintaining them in spaced apart relation on the conveyor.

2. In an apparatus of the character described, a conveyor for a sliced loaf, a pair of discs driven in synchronism with the conveyor and having sharpened edges to engage one of the cuts between slices, and means for spreading the discs apart while in engagement with the slices to shift the loaf portions apart on the conveyor.

3. In an apparatus of the character described, a conveyor comprising flight bars for advancing previously cut loaves, a pair of discs normally in face-to-face contact and having their edges constructed to provide clearances for the flight bars, said edges engaging the same cut in a loaf as the loaf is advanced by the flight bars, means for actuating the discs laterally to shift the sections of the loaf apart on the conveyor.

4. In an apparatus of the character described, a conveyor for a sliced loaf, a pair of discs having their edges normally in position to engage the same cut in the loaf while the conveyor is advancing the loaf, means for separating the discs to shift the engaged sections of the loaf apart on the conveyor, and guides for holding the shifted sections in spaced apart relation on the conveyor.

5. In an apparatus of the character described, a conveyor for a sliced loaf, a pair of discs having their edges normally in position to engage the same cut in the loaf while the conveyor is advancing the loaf, means for actuating the discs to shift the engaged sections of the loaf apart on the conveyor, movable guides for holding the sections of the loaf against the discs during said shifting of the sections, and parallel guides receiving the shifted sections.

6. In an apparatus of the character described, a conveyor for a sliced loaf, a pair of discs having their edges normally in position to engage the same cut in the loaf while the conveyor is advancing the loaf, means for moving the discs apart to space the sections of the loaf apart on the conveyor, parallel guides for holding the sections in spaced apart relation on the conveyor, and movable guides cooperating with the discs to direct the loaf sections into the parallel guides.

7. In an apparatus of the character described, a conveyor for a sliced loaf, a pair of discs having sharpened edges normally in position to engage the same cut in the loaf while the conveyor is advancing the loaf, means for moving the discs apart to space the sections of the loaf apart on the conveyor, parallel guides for holding the sections in spaced apart relation on the conveyor, and hinged guides movable in unison with the discs to direct the loaf sections into the parallel guides.

8. In an apparatus of the character described, a conveyor comprising flight bars for advancing previously sliced loaves, a pair of discs normally in face-to-face contact and having their edges sharpened to engage the same cut in the loaf as the loaf is advanced by the flight bars, said edges also being constructed to provide clearances for the flight bars, means for driving the conveyor and the discs in synchronism, and means for separating the discs to space the engaged sections of the loaf apart on the conveyor, and guides for maintaining the sections in spaced apart relation on the conveyor.

9. In an apparatus of the character described, a conveyor for advancing previously sliced loaves, a blade for opening one of the slicing cuts, a pair of discs normally in face-to-face contact and having their edges constructed to engage the opened cut, and means for moving the discs apart to shift the engaged sections of the loaf apart and maintain them in spaced apart relation on the conveyor.

10. In an apparatus of the character described, a conveyor for advancing previously sliced loaves, a stationary blade for opening one of the slicing cuts, a pair of discs normally in face-to-face contact and having their edges constructed to engage in the opened cut as the loaf is advanced by the conveyor, means for shifting the discs apart to separate the engaged sections of the loaf on the carrier, and guides for maintaining the sections in spaced apart relation on the conveyor.

JOSEPH HEXTER.
WILLIAM E. LANHAM.

REFERENCES CITED

The following references are of record in the file of this patent:

UNITED STATES PATENTS

| Number | Name | Date |
|---|---|---|
| 1,263,742 | Chase | Apr. 23, 1918 |
| 2,211,433 | Papendick | Aug. 13, 1940 |
| 2,247,697 | Papendick | July 1, 1941 |
| 2,247,698 | Papendick | July 1, 1941 |
| 2,335,849 | Ewald et al. | Dec. 7, 1943 |

FOREIGN PATENTS

| Number | Country | Date |
|---|---|---|
| 305,036 | Italy | Jan. 25, 1933 |